(12) United States Patent
Champ

(10) Patent No.: US 6,183,032 B1
(45) Date of Patent: Feb. 6, 2001

(54) VEHICLE SEATING ASSEMBLY

(75) Inventor: William Dale Champ, Elkhart, IN (US)

(73) Assignee: Glaval Corporation, Elkhart, IN (US)

(*) Notice: Under 35 U.S.C. 154(b), the term of this patent shall be extended for 0 days.

(21) Appl. No.: 09/157,897

(22) Filed: Sep. 21, 1998

(51) Int. Cl.[7] .................................................. B60N 2/10
(52) U.S. Cl. ........................ 296/65.03; 297/326; 297/336
(58) Field of Search ............................. 296/68.1, 65.01, 296/68, 63, 65.03; 297/325, 326, 335, 336, 344

(56) References Cited

U.S. PATENT DOCUMENTS

| 5,238,285 | 8/1993 | Holdampf et al. . |
| 5,271,109 | 12/1993 | Markel et al. . |
| 5,577,805 | 11/1996 | Glinter et al. . |

FOREIGN PATENT DOCUMENTS

| 628 445 | 12/1994 | (EP) . |
| 0 816 157 | 1/1998 | (EP) . |
| 0 863 042 | 9/1998 | (EP) . |

Primary Examiner—Joseph D. Pape
(74) Attorney, Agent, or Firm—Baker & Daniels

(57) ABSTRACT

The vehicle seating assembly includes a base frame, a seat frame slidably mounted on the frame they are both sliding and pivotably movement relative thereto, and a back frame mounted for pivotable movement with respect to both the seat frame and the base frame. The base frame is releasably secured to a motor vehicle through a releasable latching mechanisms. The back frame may be folded over the seat frame, and the seat assembly will then partially released from the vehicle and may be rotated about the forward latching mechanisms to a folded position. The forward latches may then be released to permit removal of the seat from the vehicle.

20 Claims, 12 Drawing Sheets

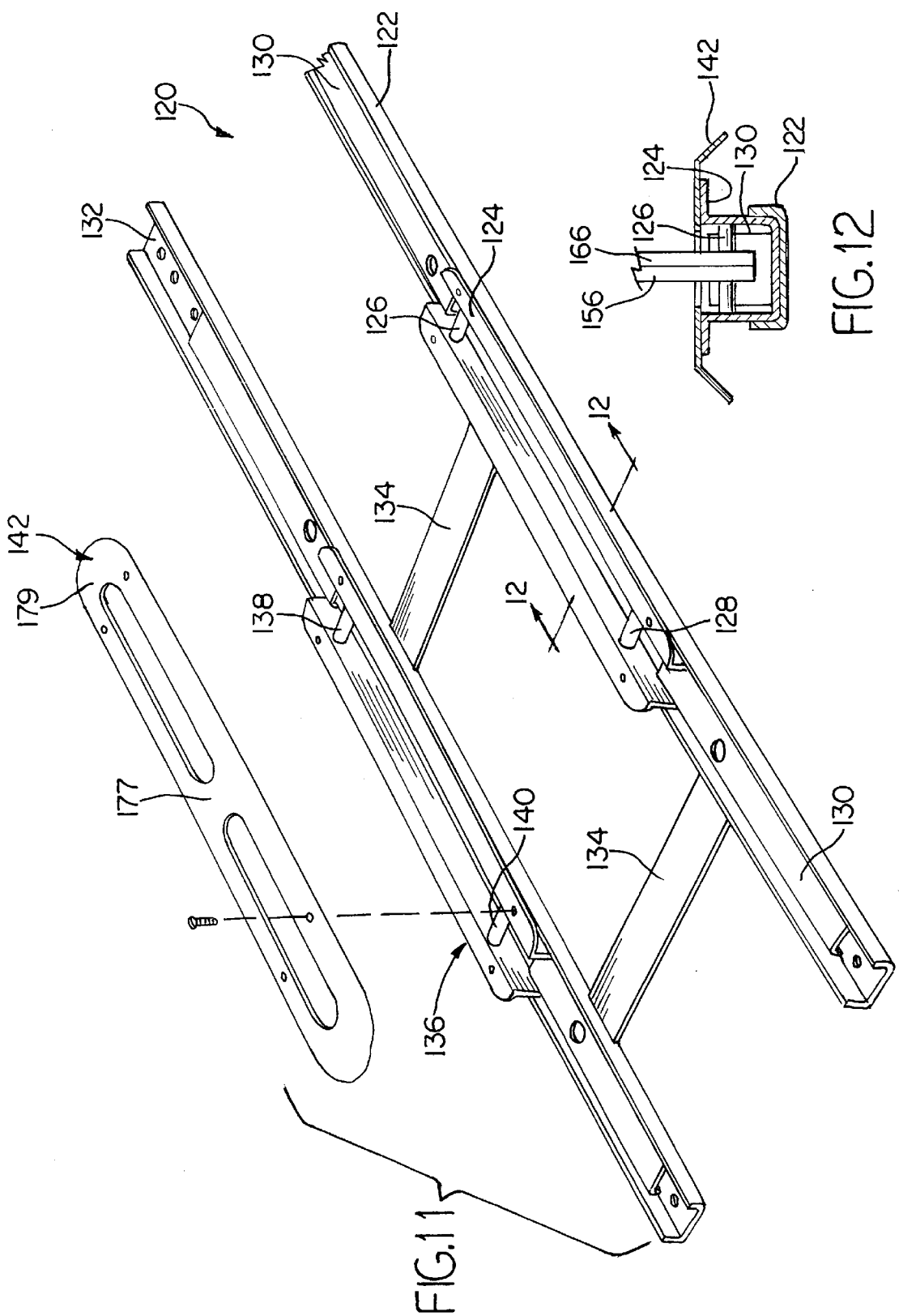

VEHICLE SEATING ASSEMBLY

BACKGROUND AND SUMMARY OF THE INVENTION

This invention relates to a vehicle seat for a motor vehicle.

Passenger vans are multi-purpose vehicles. While usually used for carrying multiple passengers, owners also may use vans to carry cargo, so that it is desirable that at least some of the rear seats of the van be able to be folded and/or removed to permit the rear portion of the van to handle objects that would normally be too large to fit into the van with all of the seats in the normal riding position. Van owners sometimes use vans for camping, and it is accordingly desirable to provide seating which may be folded flat into a bed.

The present invention provides a bench type seat for installation in a passenger van in which the seat back can be folded from its normal upright position to a horizontal position. The entire seat assembly can then be folded forward upon release of rear retaining latches. Accordingly, the volume of the van available for cargo is substantially increased. However, if a even greater volume of cargo must be hauled, the seat can be entirely removed from the van. The seat assembly may be converted into a bed by folding the seat backwards as the seat is shifted forward such that the seat back and seat are substantially flush with one another.

BRIEF DESCRIPTION OF THE DRAWINGS

These and other advantages of the present will become apparent from the following specification, with reference to the accompanying drawings, in which:

FIG. 11 is a fragmentary view in perspective illustrating the receptacles mounted on the floor of the vehicle in which the seat illustrated in FIGS. 1–10 is installed in order to releasably mount the seat to the vehicle; and FIG. 12 is a view taken substantially along line 12—12 of FIG. 11.

DETAILED DESCRIPTION OF THE PREFERRED EMBODIMENTS

Figure 1:
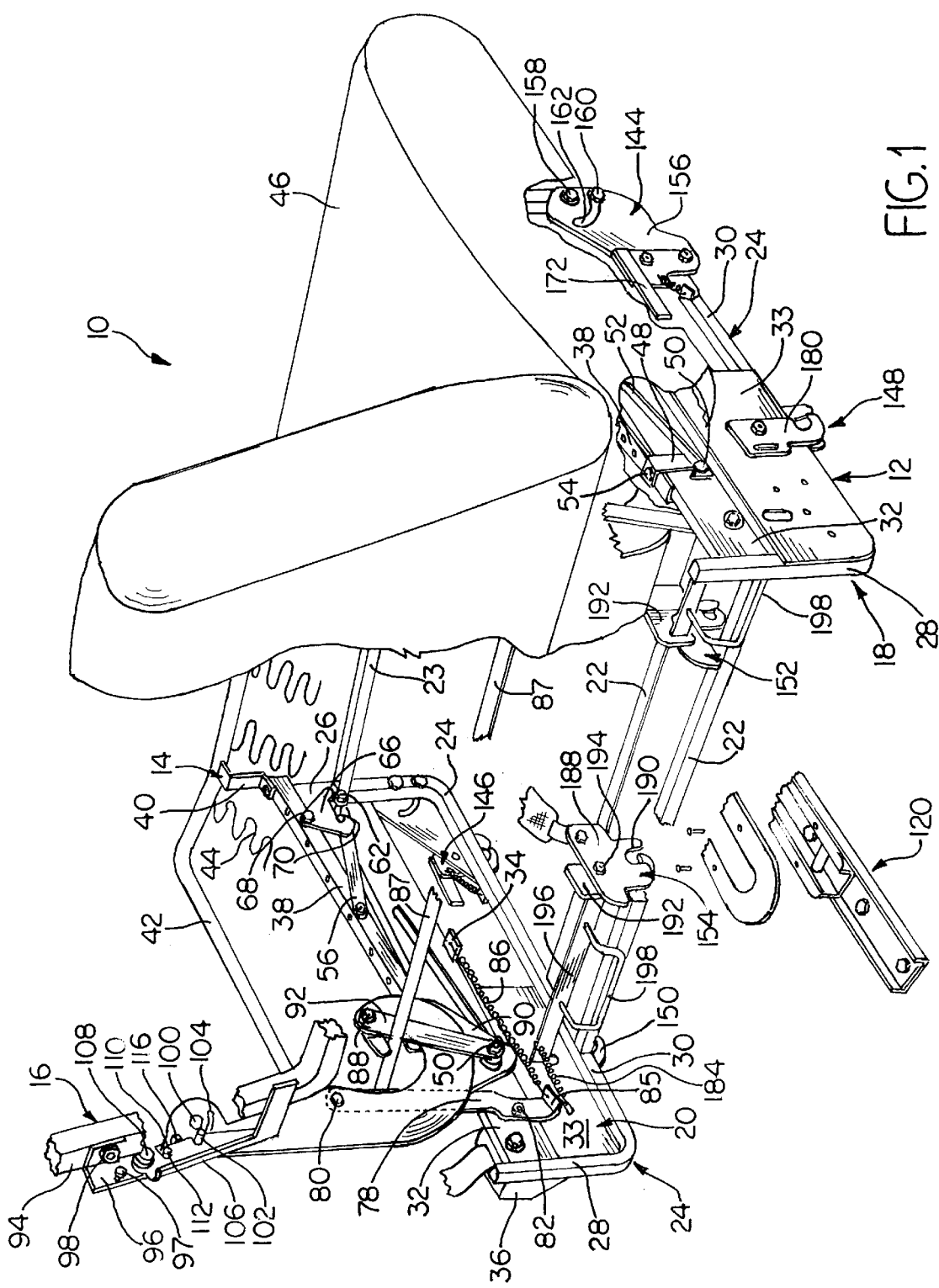
FIG. 1 is a fragmentary view in perspective of a vehicle seat made pursuant to the teachings of the present invention.

Referring now to the drawings, a vehicle seat generally indicated by the numeral 10 (FIG. 1) includes a base frame generally indicated by the numeral 12, a seat frame generally indicated by the numeral 14 and a back frame generally indicated by the numeral 16. The base frame 12 includes a pair of side frame members 18, 20 which are interconnected by transverse bar members 22 and 23. Each of the side frame members 18, 20 include a generally U-shaped support 24 which includes an upwardly projecting front edge portion 26 (FIG. 1), an upwardly projecting rear edge portion 28, and a bottom portion 30 extending between the front and rear edge portions 26, 28. Plates 32 extend between the front and rear edge portions 26 and 28, and still another plate 33 extends between the rear edge portion 28 and bottom edge portion 30. Tabs 34 (FIG. 1) project inwardly toward the other side frame member from each of the plates 32. A seat belt retractor 36 is also mounted on the plates 32.

Figure 2:
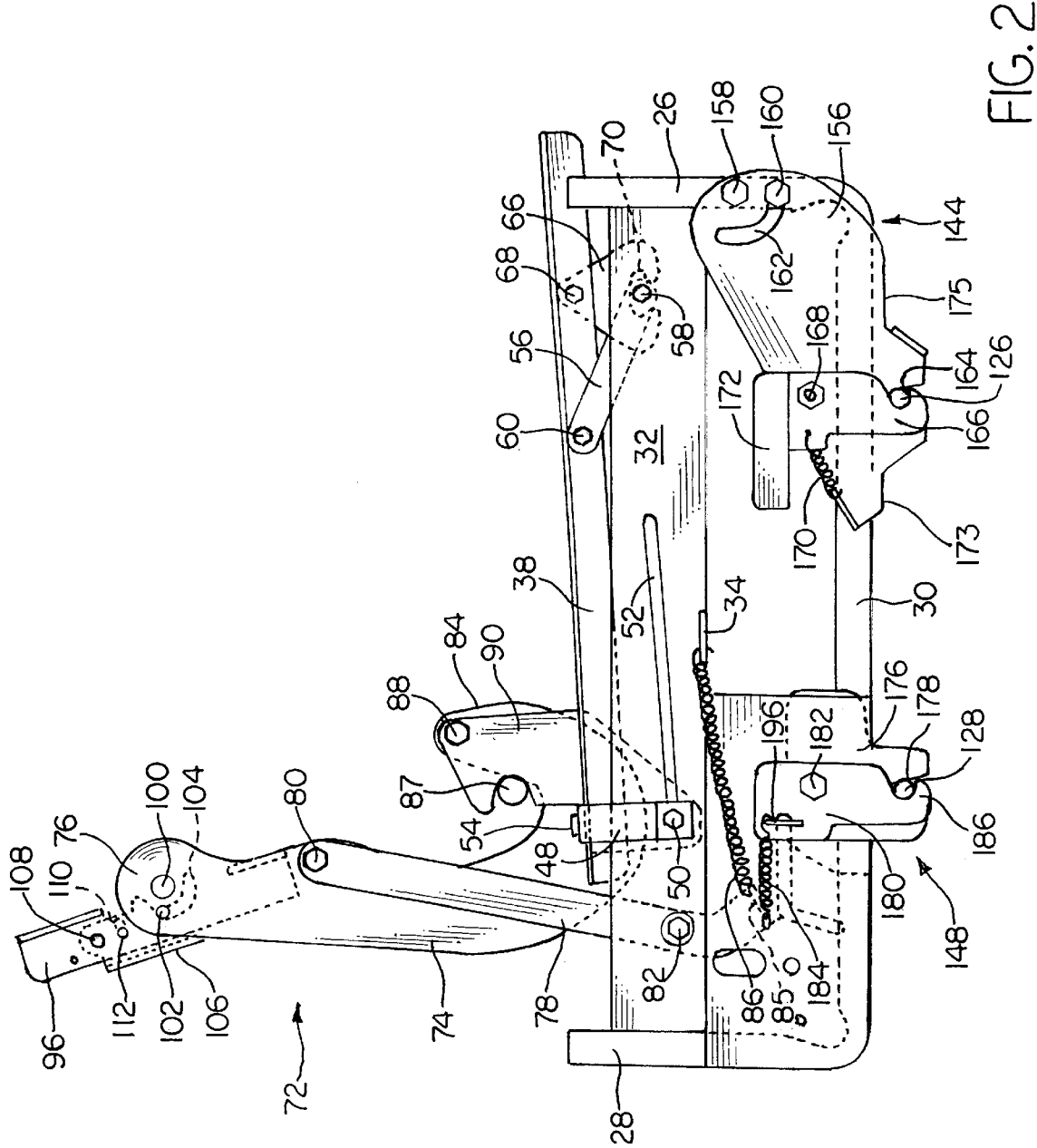
FIG. 2 is a right side elevational view of the vehicle seat illustrated in FIG. 1, illustrated with the upholstery removed.

The seat frame member 14 (FIGS. 1 and 2) includes side frame portions 38 that extend along the upper edges of the plates 32. Angle brackets 40 (FIG. 1) connect each of the side frame portions 38 to a spring frame 42 which carries springs 44 which support upholstery 46. The seat frame member 14 is slidably and pivotably connected to each of the side frame members 18, 20 by angle brackets 48 (FIGS. 1 and 2) which extend between a corresponding one of the side frame portions 38 and a pin or bolt 50 which is both slidably and pivotably engaged in an ascending track 52 on the corresponding plate 32. The angle bracket 48 is secured to the corresponding side frame portion 38 by appropriate fastener 54. Pivot arms 56 are pivotably secured to plate 32 by a pivotable connection 58 and to a corresponding side frame portion 38 by pivot connection 60 (FIG. 2). Pivot 58 has an inwardly projecting portion 62 (FIG. 1) which is received within a gap 70 of a pendulum acceleration responsive lock 66 (FIGS. 1 and 2). The lock 66 is pivotably mounted to a corresponding side frame member 38 by pivot connection 68 so that deceleration of the vehicle upon which the seat 10 is mounted in excess of a predetermined amount causes the lock 66 to swing around the pivot connection 68 to thereby engage the inwardly projecting portion 62 and to thereby lock the seat frame 14 against movement relative to the base frame 12. The inwardly extending portion 62 is able to pass through the gap 70 to permit the seat frame 14 to be moved relative to the base frame 12 as will hereinafter be described.

Each side of the back frame 16 is connected to both the seat frame 14 and the base frame 12 by a linkage generally indicated by the numeral 72 (FIG. 2). Linkage 72 includes first member 74 which includes an upper end 76 that is connected to back frame 16 as will hereinafter be described and a second member 78 which is pivotably connected to first member 74 by pivot connection 80 and to the plate 32 by pivot connection 82. The member 78 terminates in a tab 85 (FIG. 1). A coil spring 86 (FIGS. 1 and 2) extends between the tab 34 on the plate 32 and tab 85 on second member 78 to exert a biasing force on the latter urging member 78 in a counter clockwise direction viewing FIG. 2.

The end of the first member 74 opposite the end 76 is defined by a hook 84 (FIG. 2) that extends around the portion 87 (FIGS. 1 and 2). A pivot connection, such as a bolt 88, pivotably connects the outer end of the hook portion 84 to a sliding bracket 90 (FIG. 2), which is connected for sliding movement along the track 52 by the pin 50, such that the bracket 90, because of the connection provided by the angle bracket 48, moves with the seat frame 14. A strap 92 (FIG. 1) extends between the pins 50 and bolt 88 for guiding the member 74 as it pivots about the bolt 88.

Figure 10:
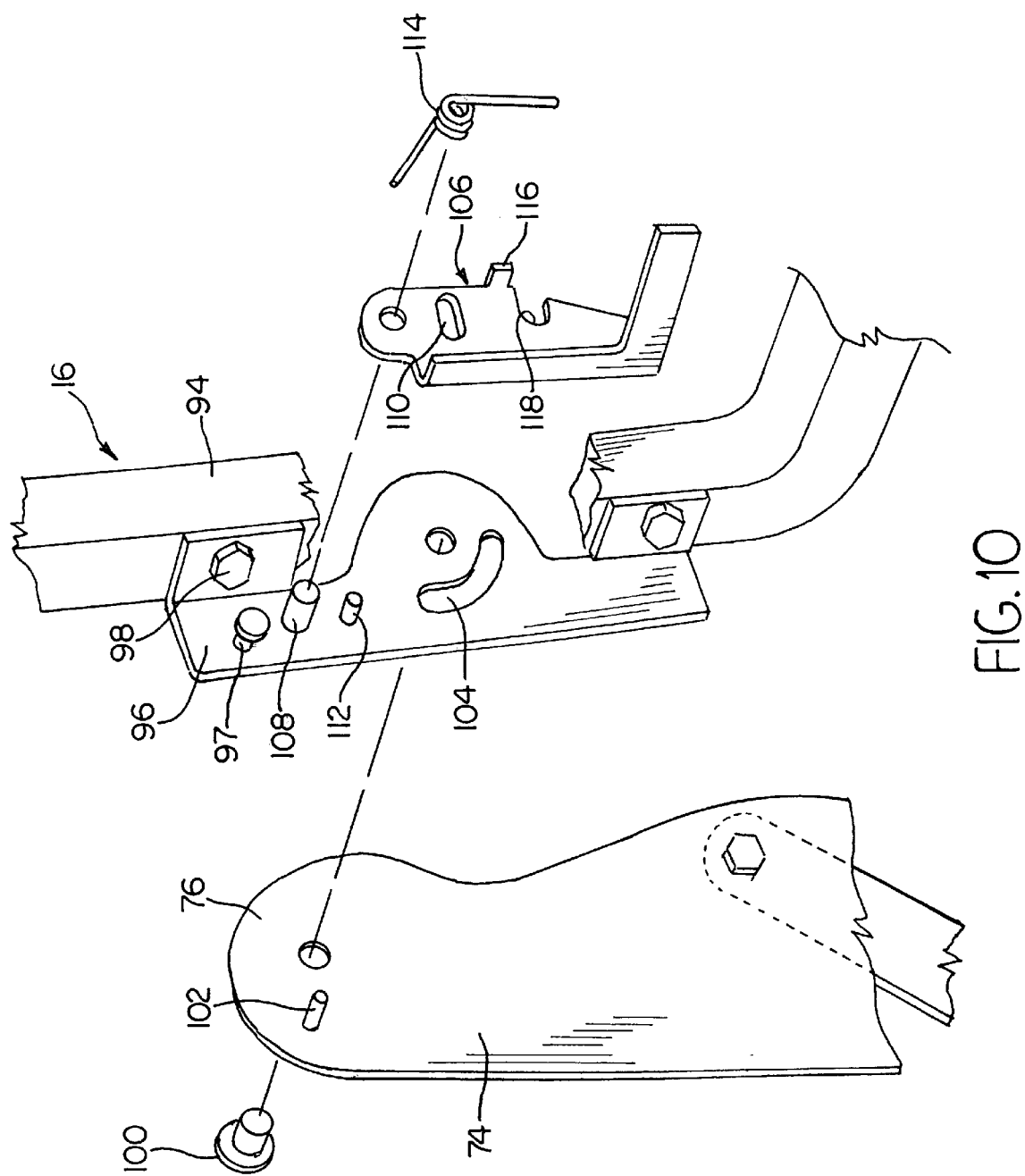
FIG. 10 is a detailed view of the manner in which the back frame of the seat illustrated in FIGS. 1–9 is attached to the linkage used to move the back frame from the upright position to the position in which the frame is substantially flush with the seat frame.

The back frame 16 includes side edges 94 (FIG. 1) which extend substantially parallel to corresponding linkage 72. Brackets 96 are secured to each of the side edges 94 by fasteners 98 (FIGS. 1 and 10). A pivot connection 100 pivotably connects the end 76 of first member 74 to a corresponding one of the brackets 96. A projection 102 extends from the end 76 and is engaged with arcuate slot 104 on the bracket 96. Each bracket 96 is provided with a latch 106 pivotably connected to the bracket 96 via pivot connection 108 and each latch 106 further includes an elongated slot 110 which receives projection 112 extending from the bracket 96, which limits the arc of pivotable movement of the latch about the pivot 108. A spring 114 extends around the pivot 108 and bears against the projection 97 on bracket 96 and against a tab 116 on the latch 106 to bias the latter toward the back frame 16. Each latch 106 further includes a cut out recess 118 which engages the projection 102 when the seat frame is in the normal upright seating position to thereby latch the frame against movement relative to the member 74.

The floor of the vehicle is provided with latching receptacle assemblies generally indicated by the numeral 120 (FIGS. 1, 11 and 12). Although only one set of latching receptacle assemblies 120 is illustrated, it will be understood that a pair of such assemblies are provided. Latching receptacle assembly 120 includes a first channel rail 122 which is mounted on the floor of the vehicle such that rail 122 extends below side frame member 18. The channel rail 122 extends for a substantial distance beyond the side frame member 18 in both directions and is provided with a latching receptacle 124 which is rigidly secured in channel member 122. Latching cross pins 126, 128 extend across the gap defined in the latching receptacle 124. Cover plates 130 are secured to the channel members 122 to fill in the channel members at the ends of the latching receptacle 124. Channel member 122 is connected to a second channel member 132 which is offset from the channel member 122 by cross braces 134 that are secured to both the channel member 122 and the channel member 132. Channel member 132 extends beneath the seat 10 offset from the side frame member 18 for a purpose to be described hereinafter. The channel member 132 carries a latching receptacle 136 which carries latching cross pins 138 and 140. The receptacle 136 and cross pins 138, 140 are substantially identical to the latching receptacle 124 and cross pins 126 and 128. A decorative cover 142 is mounted on each of the latching receptacles 136, 124. It will be understood that another one of the receptacle assemblies 120 will be mounted on the vehicle floor with the channel member 132 extending below the side frame member 20 and with the channel member 122 off set from therefrom. The latching receptacles 120 can be modified for use in different vehicles by modifying the location at which the latch receptacles 124, 136 are secured to the channel members 122, 132.

Figure 13:
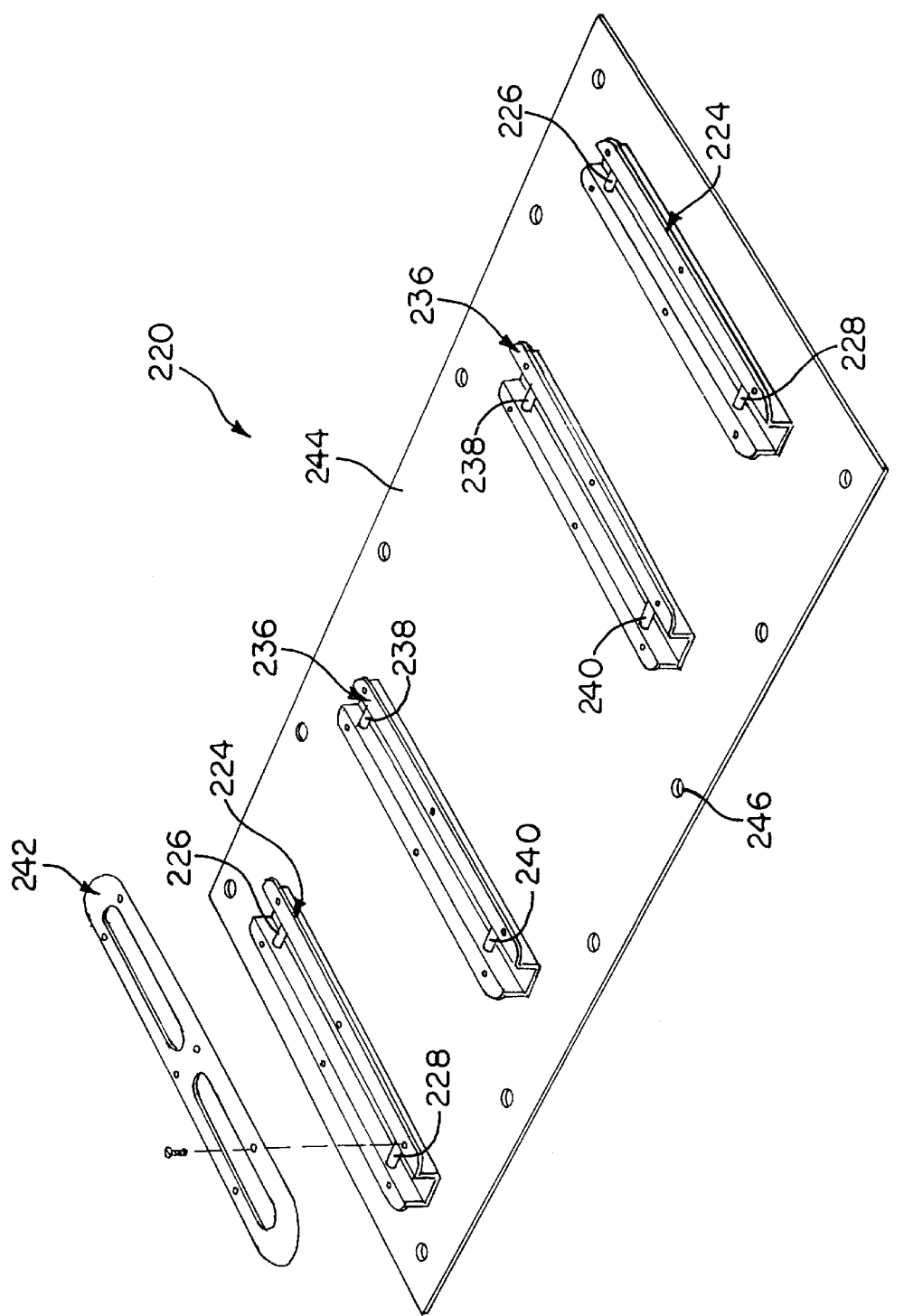
FIG. 13 is a perspective view of an alternative embodiment of the latching receptacle assemblies shown in FIG. 11.

Referring to FIG. 13, a modified latching receptacle assembly 220 is provided with latching receptacles 224, 236 which correspond to the latching receptacles 124, 136 in FIG. 12. As in the embodiment of FIG. 12, the latching receptacles 224, 236 are provided with cross pins 226, 228 and 238, 240 and with cover plates 242. The receptacles 224, 236 are welded to a plate 244 which is secured to the vehicle by appropriate fasteners (not shown) installed through openings 246.

Referring to FIGS. 1 and 2, the seat 10 is secured to the latching receptacle assembly 120 by a first set of retaining latches 144, 146 and a second set of retaining latches consisting of side frame mounted latches 148, 150 and bar frame mounted latches 152, 154, which are secured to transverse bars 22 such as by welding. Each of the latches 144, 146 include a pivot plate 156 which is pivotably attached to front portion 26 of side frame member 18, 20 at pivot connection 158. A guide pin 160 mounted on the front edge portion 26 engages slot 162 in pivot plate 156. Pivot plate 156 further includes a slot 164 that receives cross pin 126 when the seat 10 is installed in the vehicle. A latching member 166 is pivotably mounted on pivot plate 156 at pivot connection 168. A spring 170 urges the latching member 166 counter clockwise when viewing FIG. 2 so that the latching member 166 latches beneath the latching cross pin 126 to thereby assist in retaining the seat 10 on the vehicle. A handle 172 is provided to facilitate operation of the latching member 166. Pivot plate 156 has a first pair of engagement surfaces 173, 175 which are held tight against a second pair of engagement surfaces 177, 179 of cover 142 when latch 166 is engaged into cross pin 126. This secures plate 156 from movement or rotation relative to latching receptacle assemblies 120 thereby allowing seat 10 to be rotated upwardly around pivot 158 without moving or releasing plate 156. Latches 148 include a plate 176 which is rigidly mounted to bottom edge 30 such as by welding and includes an open ended slot 178 which is adapted to receive cross pin 128 when the seat is installed in the vehicle (FIGS. 1 and 2). A member 180 is pivotably attached to plate 176 by pivot connection 182 and is urged counter clockwise viewing FIG. 2 by spring 184 to cause projection portion 186 of member 180 to latch beneath the cross pin 128. Each of the bar mounted latches 152, 154 (FIG. 1) include a plate 188 that is secured to the bars 22 such as by welding and include an open ended slot 190 that engages a corresponding one of the latching cross pins. A pivoting member 192 is pivotably mounted on the plate 188 by pivot connection 194. An actuating lever 196 extends between the pivoting members 180 and 192 and is equipped with a handle 198 whereby the pivoting members 192, 180 may be simultaneously pivoted by operation of the levers 198. The springs 184 bias both of the members 180, 192 to the positions illustrated in the drawings (FIGS. 1 and 2).

Figure 3:
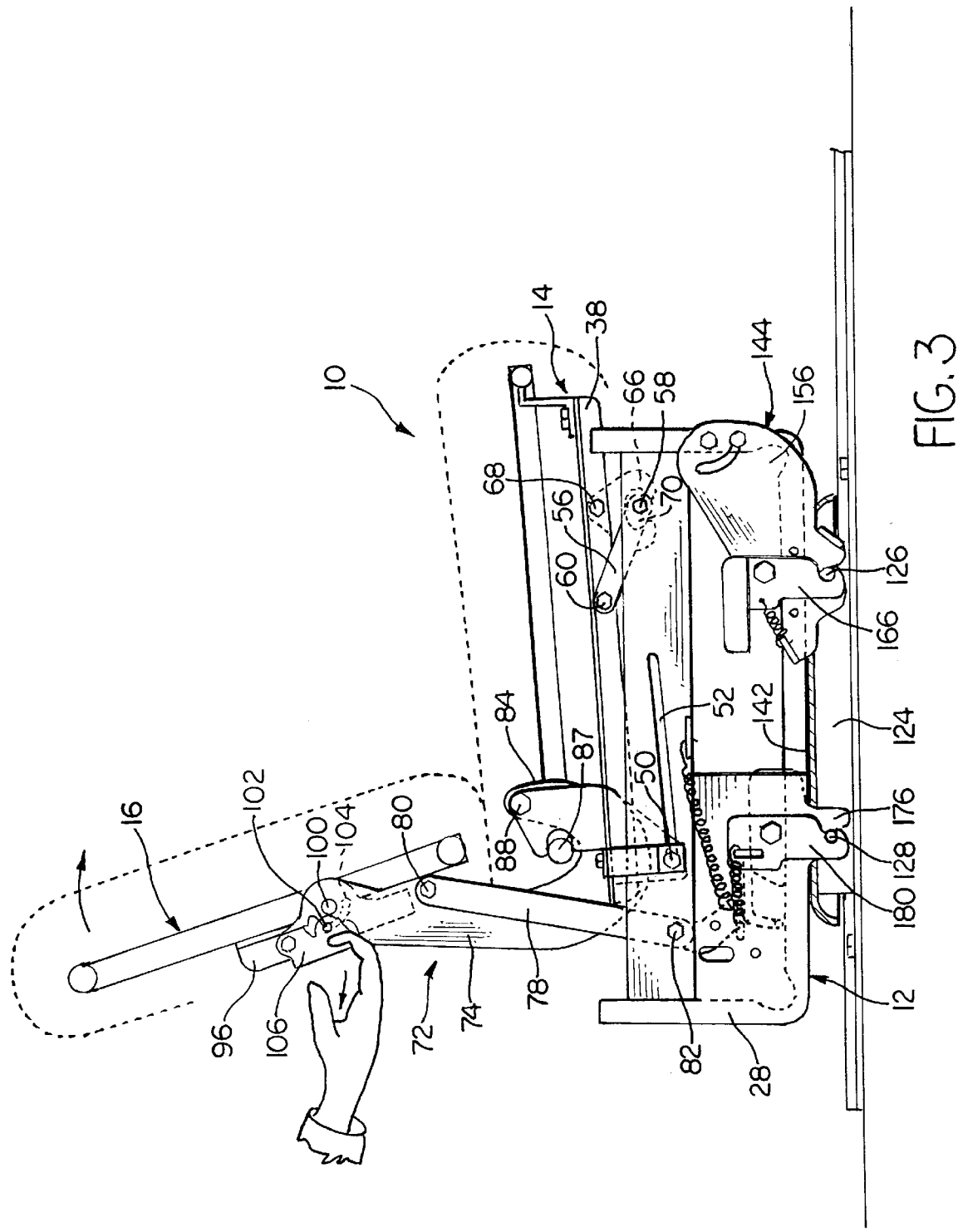
FIGS. 3–9 are views similar to FIG. 2, but with the upholstery shown by dashed lines, and illustrating the manner in which the components of the vehicle seat of FIGS. 1 and 2 are moved between various positions.
Figure 4:
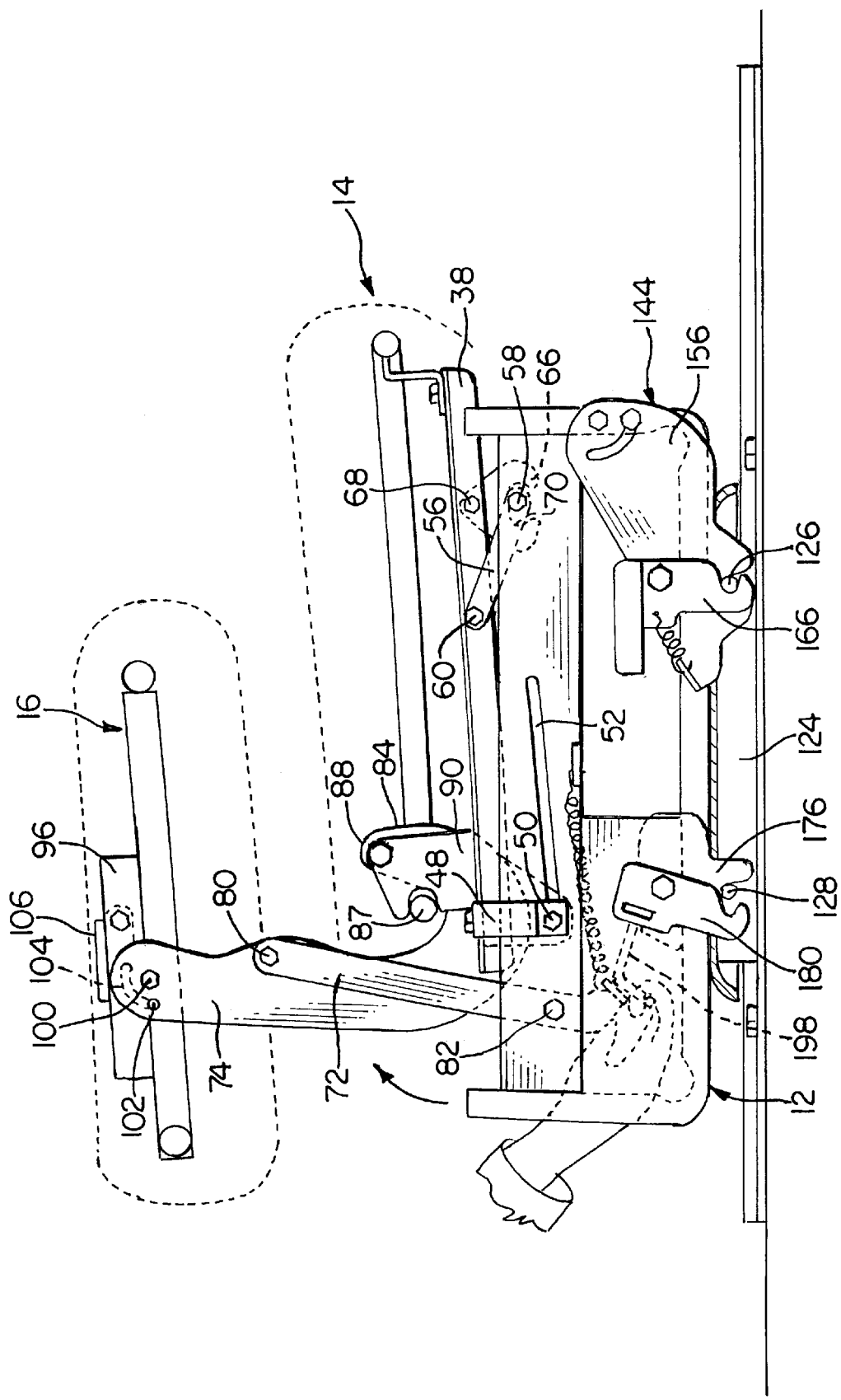
Figure 5:
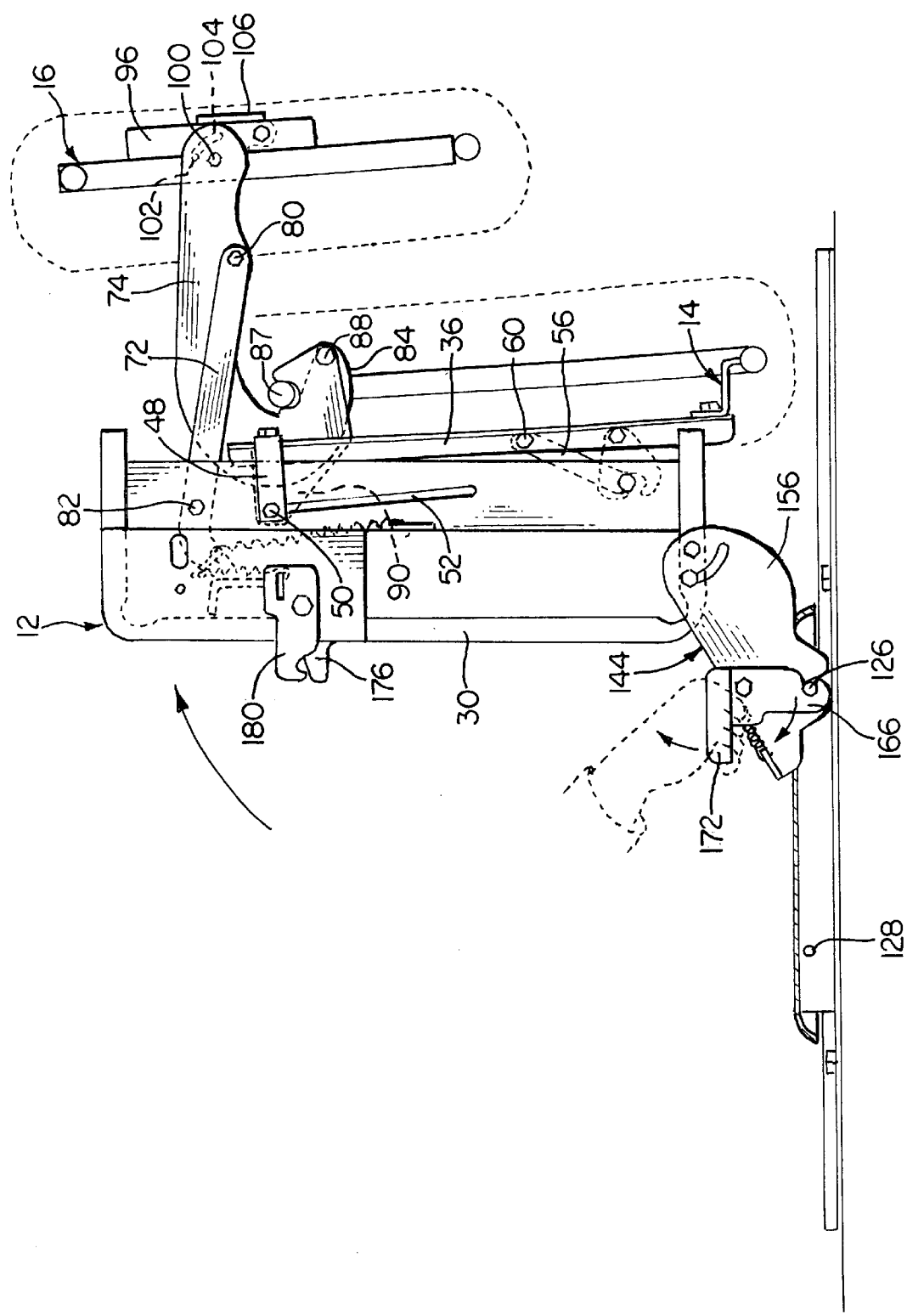
Figure 6:
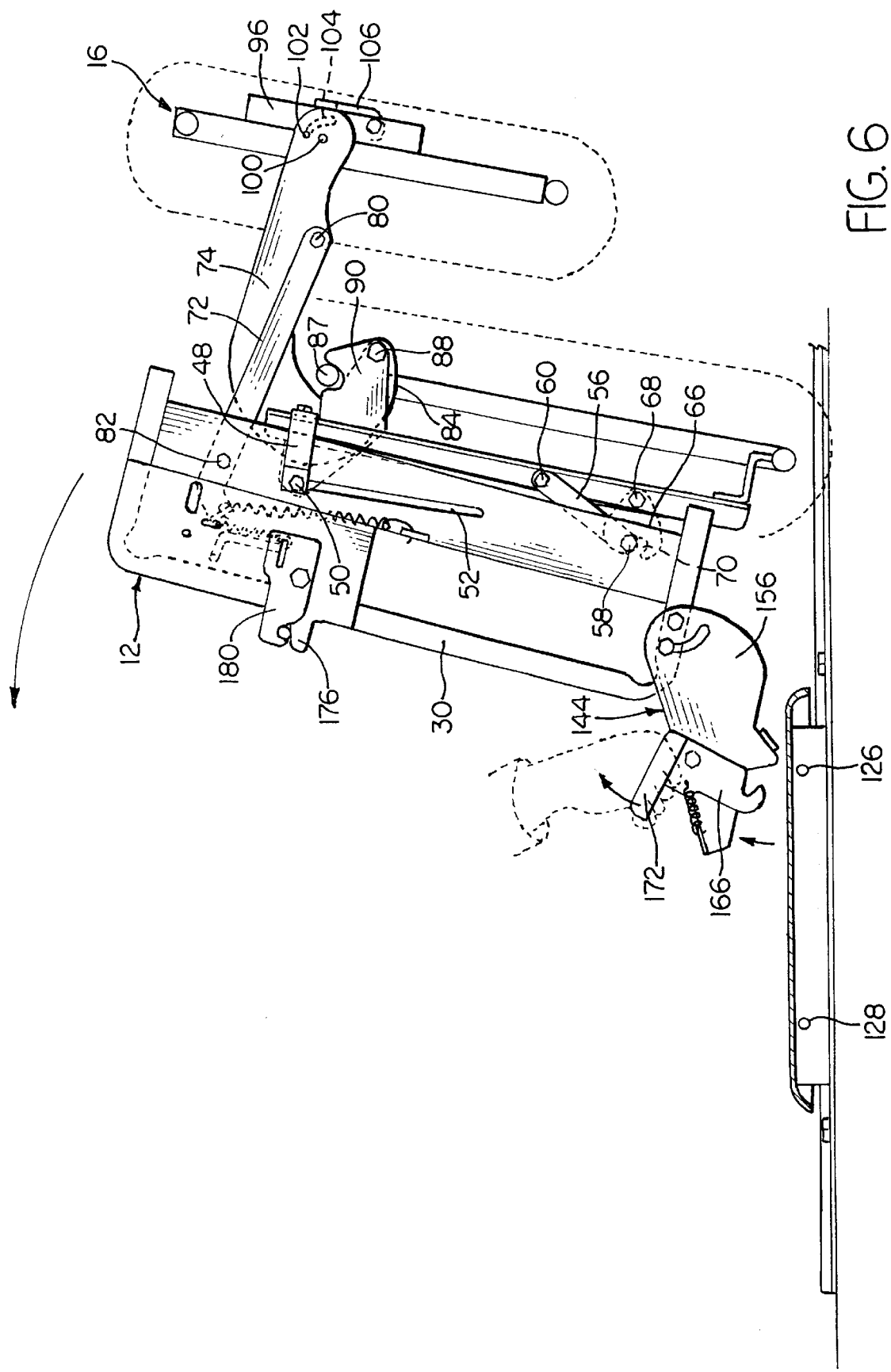

In operation, the back frame 16 may be folded flat to overlay the seat frame 14 by operating the lever 106 to release the projection 102, and to thereby permit the seat frame 16 to pivot about the pivot 100 from the FIG. 3 position to the FIG. 4 position. To increase the amount of cargo room still more, the entire seat assembly 10 may be folded forward by operating the handles 198 to release the side frame mounted latches 148, 150 and the bar mounted latches 152 and 154, as illustrated in FIG. 4. By rotating the latches 148, 150, 152 and 154 about the corresponding pivots, the hooked portions are withdrawn from below their corresponding latching pins. Accordingly, the seat assembly 10 may be rotated upwardly about pivots 158 into the FIG. 5 position. This substantially increasing the cargo carrying capacity of the vehicle. If still more cargo capacity is required, the entire seat 10 may be removed by operating the handles 172 to withdraw the members 166 from below the latching pins, as illustrated in FIGS. 5 and 6. This completely releases the seat from the vehicle permitting it to be removed.

Figure 7:
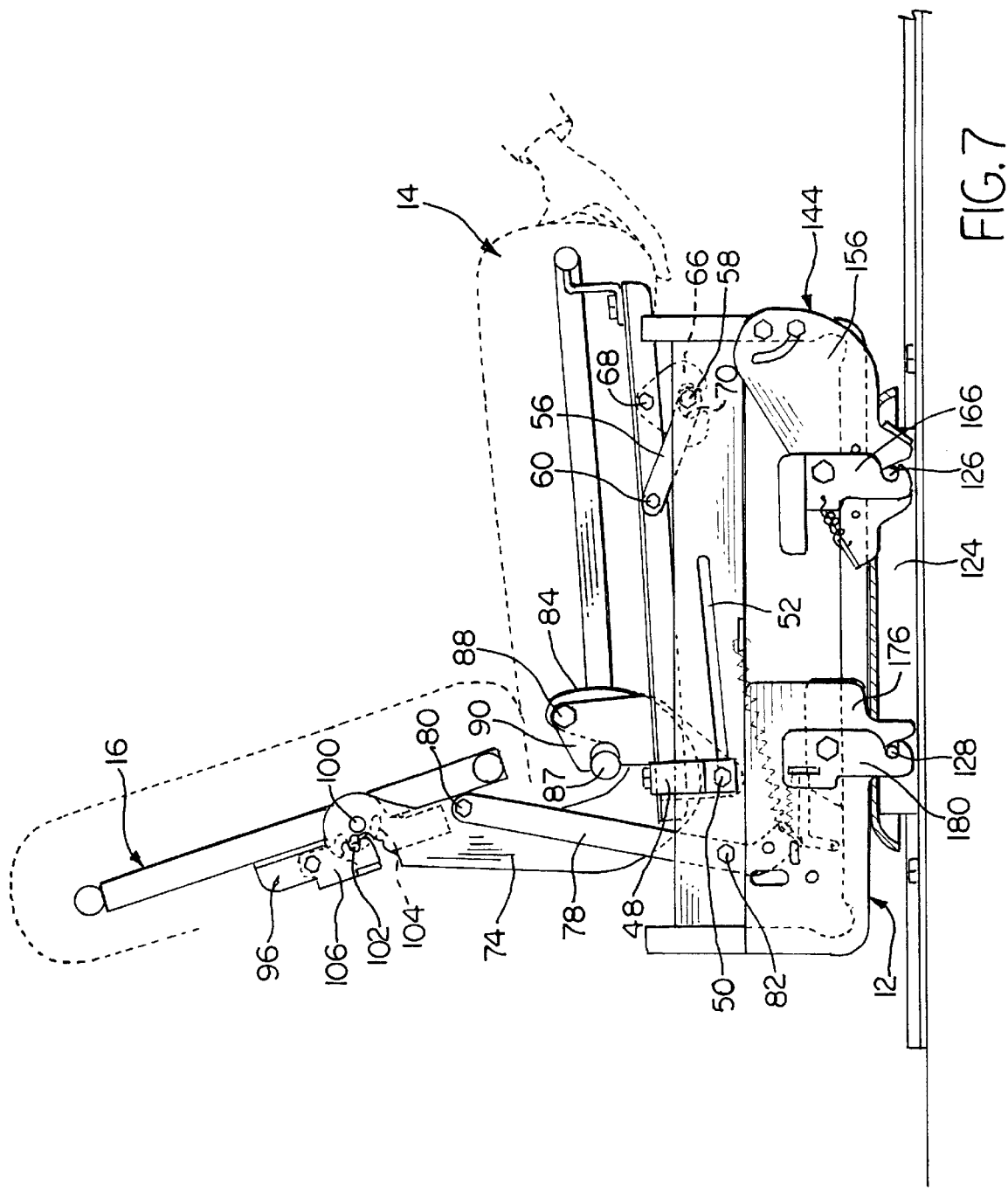
Figure 8:
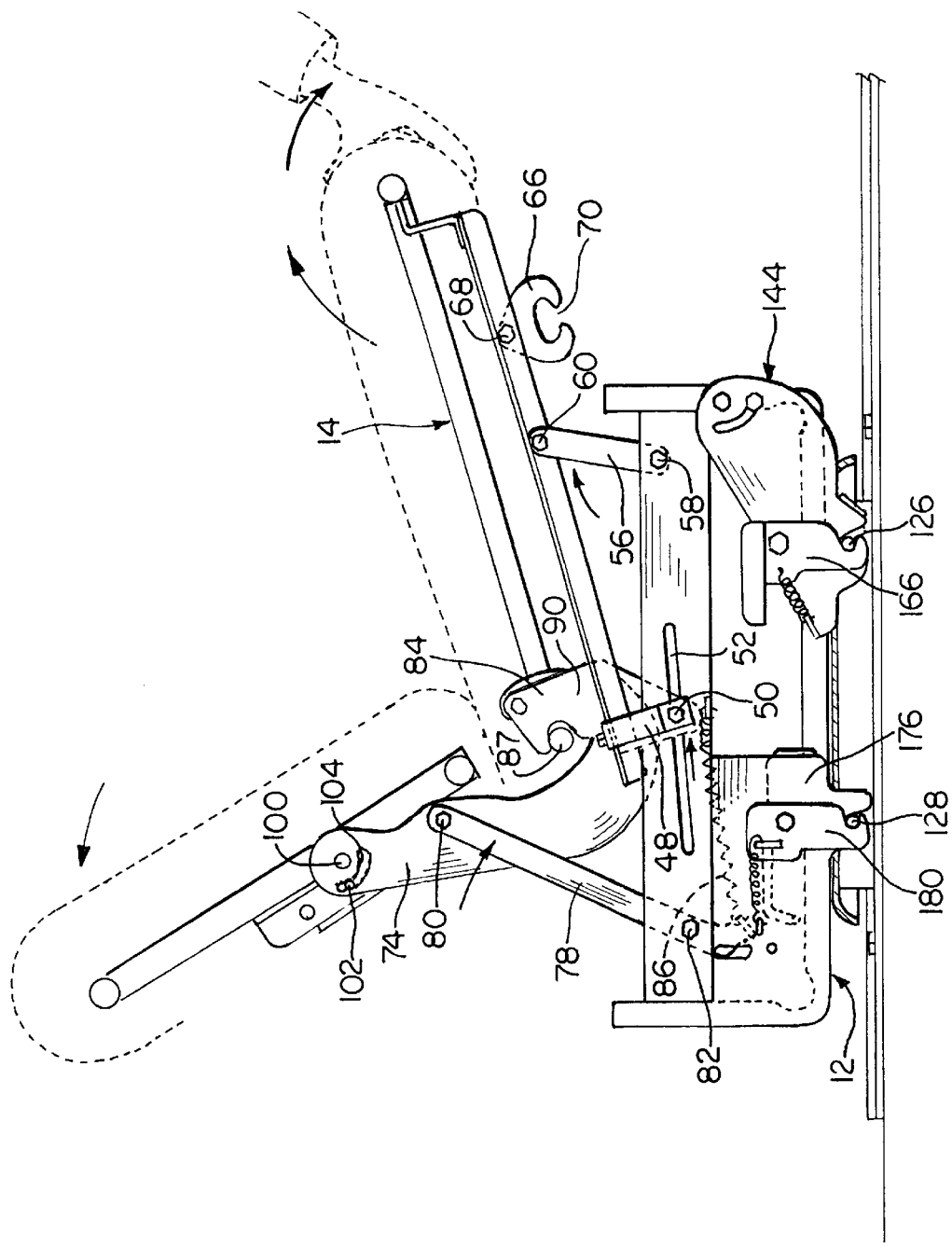
Figure 9:
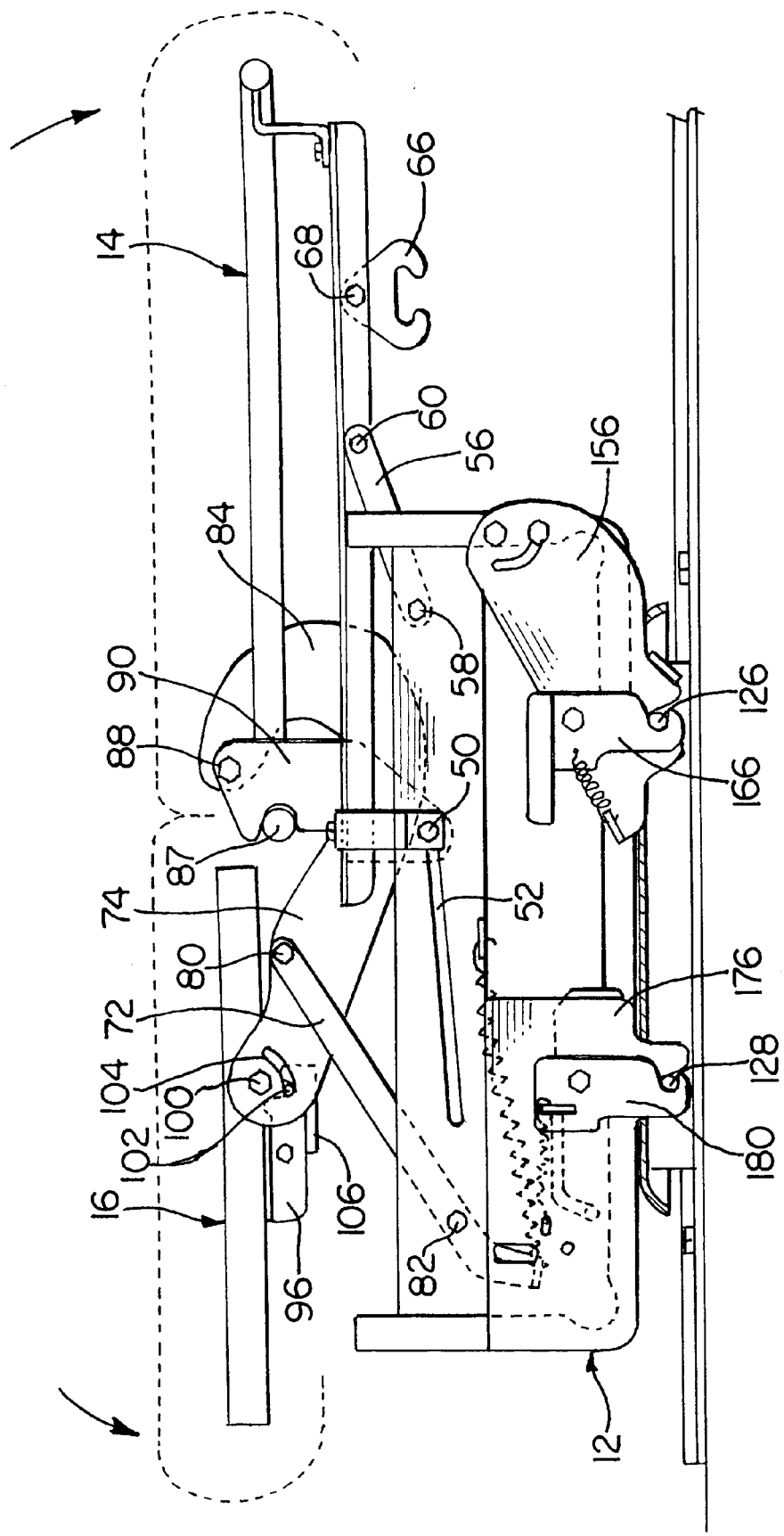

Referring now to FIG. 7–9, the seat 10 can be folded flat into a substantially horizontal orientation as shown in FIG. 9 in which the seat frame and the back frame are substantially flush with one another. When the seat is being converted into a bed, the outer edge of the seat frame 14 is lifted upwardly, as indicated in FIGS. 7 and 8. Accordingly, acceleration responsive lock 66 is lifted upwardly such as the gap 70 withdraws past pivot 58. When in the normal seating position, acceleration responsive lock 66 is responsive to deceleration of the vehicle to latch against the pin 58, thereby locking the seat frame and back frame against movement relative to the base frame 12. After the seat frame 14 is lifted sufficiently to enable the acceleration responsive latch 66 to withdraw from the pivot pin 58, the seat frame is moved forward so that angle bracket 48, pin 50 and sliding bracket 84 are all moved toward the front edge portion 26 of the base frame 12. As the angle bracket 48, sliding bracket 84 and pin connection 50 move along the track 52 toward the front edge portion 26, members 78 of linkages 72 rotate in a clockwise direction, thereby extending spring 86. As the bracket 84 is moved and the member 78 is rotated in the clockwise direction, the member 74 will be rotated in the counter clockwise direction as indicated by the arrow in FIG. 8. The seat frame 16 remains latched against movement relative to the member 74. Accordingly, as the seat frame 14 is moved forward, the back frame 16 is rotated into the substantially flush position illustrated in FIG. 9. When the seat frame is to be returned to the upright normal seating position, the seat frame 16 is lifted slightly, which permits the spring 86 to urge the member 78 towards the position illustrated in FIG. 2. Accordingly, because of the interconnection between the member 78, and the member 74, the bracket 84 and the seat frame 14 through angle bracket 48, the seat frame 16 will also be returned to the normal seating position.

What is claimed:

1. A vehicle seat, including:

a base frame;

a seat frame connected to the base frame;

a latching receptacle secured to the vehicle, the latching receptacle including a first pair of surfaces and a securing member located between the first pair of surfaces;

first and second sets of latches for selectively securing the base frame to and releasing the base frame from the vehicle;

the first set of latches including a plate engaging the securing member and a latching member pivotally mounted on the plate;

a pivot connection securing the plate to the base frame to permit the base frame to pivot about the first set of latches when the second set of latches has been released; and the first set of latches further including a second pair of surfaces engaging the first pair of surfaces when the latching member engages the securing member, thereby preventing rotation of the plate relative to the latching receptacle.

2. A vehicle seat according to claim 1, further including a back frame connected to the base frame so as to be moveable from a first position substantially perpendicular to the seat frame to a second position substantially parallel to the seat frame.

3. A vehicle seat according to claim 1, wherein the latching member is located between the second pair of surfaces.

4. A vehicle seat according to claim 1, further including a bar extending between opposite sides of the base frame and wherein the second set of retaining latches includes at least one latch mounted on the bar.

5. A vehicle seat according to claim 1, further including an actuating lever for simultaneously actuating all of the second set of latches.

6. A vehicle seat according to claim 4, further including a seat belt bracket connected to the latch mounted on the bar.

7. A vehicle seat according to claim 1, further including a pair of parallel channels to which the latching receptacle is secured.

8. A vehicle seat according to claim 2, further including a pin connecting the back frame to the base frame such that the back frame can pivot from the first position to the second position.

9. A vehicle seat according to claim 8, further including a lever movable from a first position engaged with the pin to prevent movement of the back frame to a second position disengaged from the pin to permit movement of the back frame.

10. A vehicle seat according to claim 9, further including a second pin for limiting movement of the lever.

11. A vehicle seat, including:

a base frame having first and second side frame members and a bar extending between the side frame members;

a seat frame connected to the base frame;

first and second latches connected to the first side frame member for selectively securing the base frame to and releasing the base frame from a vehicle;

third and fourth latches connected to the second side frame member for selectively securing the base frame to and releasing the base frame from a vehicle;

a fifth latch mounted on the bar between the side frame members;

a first latching receptacle extending beneath the first side frame member for engaging the first and second latches;

a second latching receptacle extending beneath the second side frame member for engaging the third and fourth latches; and a third latching receptacle for engaging the fifth latch.

12. A vehicle seat according to claim 11, wherein the first, second and third latching receptacles are connected to parallel channel members secured to a vehicle.

13. A vehicle seat according to claim 11, wherein the first, second and third latching receptacles are mounted on a plate secured to a vehicle.

14. A vehicle seat according to claim 11, further including a seat belt bracket attached to the fifth latch.

15. A vehicle seat, including:

a base frame having first and second side frame members;

a seat frame connected to the base frame;

a back frame connected to the base frame;

a bar extending between the first and second side frame members;

first and second sets of latches for selectively securing the base frame to and releasing the base frame from a vehicle, the second set of latches including at least one latch connected to the bar; and an actuating lever extending between the first and second side frame members for actuating the second set of latches.

16. A vehicle seat according to claim 15, wherein the second set of latches further includes a latch mounted to the first side frame member and a latch mounted to the second side frame.

17. A vehicle seat according to claim 15, wherein the first set of latches includes a latch mounted to the first side frame member and a latch mounted to the second side frame member.

18. A vehicle seat for a motor vehicle, including:

a base frame;

a seat frame connected to the base frame;

a back frame connected to the base frame by a pin, the back frame being moveable from an upright position to a position overlying the seat frame; and a latching lever movable from a first position engaging the pin to prevent movement of the back frame about the pin.

19. A vehicle seat according to claim 18, wherein the lever is pivotally mounted on the back frame and includes a recess for receiving the pin.

20. A vehicle seat according to claim 18, wherein a second pin limits pivoting of the lever.

* * * * *